US011142832B2

(12) United States Patent
O'Brien et al.

(10) Patent No.: US 11,142,832 B2
(45) Date of Patent: Oct. 12, 2021

(54) METHODS AND SYSTEMS FOR SYNGAS PRODUCTION AND FOR EFFICIENT, FLEXIBLE ENERGY GENERATION

(71) Applicant: Battelle Energy Alliance, LLC, Idaho Falls, ID (US)

(72) Inventors: James E. O'Brien, Idaho Falls, ID (US); Carl M. Stoots, Idaho Falls, ID (US); Michael G. McKellar, Idaho Falls, ID (US); Richard D. Boardman, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 164 days.

(21) Appl. No.: 16/484,776

(22) PCT Filed: Feb. 9, 2018

(86) PCT No.: PCT/US2018/017542
§ 371 (c)(1),
(2) Date: Aug. 8, 2019

(87) PCT Pub. No.: WO2018/148490
PCT Pub. Date: Aug. 16, 2018

(65) Prior Publication Data
US 2019/0376190 A1 Dec. 12, 2019

Related U.S. Application Data

(60) Provisional application No. 62/456,963, filed on Feb. 9, 2017.

(51) Int. Cl.
*C25B 1/042* (2021.01)
*C21B 13/00* (2006.01)
(Continued)

(52) U.S. Cl.
CPC .......... *C25B 1/042* (2021.01); *C21B 13/0073* (2013.01); *C25B 1/04* (2013.01);
(Continued)

(58) Field of Classification Search
CPC ............ C25B 1/04; C25B 1/042; C25B 15/08
See application file for complete search history.

(56) References Cited

U.S. PATENT DOCUMENTS 4,265,868 A   5/1981   Kamody
7,951,283 B2  5/2011   Stoots et al.
(Continued)

FOREIGN PATENT DOCUMENTS

IN   2144MUM2011 A   12/2012
JP   2013-173884 A    9/2013
(Continued)

OTHER PUBLICATIONS

Carl Stoots, "Production of Synthesis Gas by High-Temperature Electrolysis of H2O and CO2 (Coelectrolysis)," Ldaho National Laboratory, (2010), 21 pages.
(Continued)

*Primary Examiner* — Nicholas A Smith
(74) *Attorney, Agent, or Firm* — TraskBritt (57) ABSTRACT

Methods for producing syngas (e.g., $H_2$ and CO) include introducing a stream comprising $H_2O$ and $CO_2$ to a high-temperature co-electrolysis (HTCE) unit. A $CO_2$ sweep gas is also introduced to the HTCE unit. Both $H_2O$ and $CO_2$ are reduced in the HTCE unit to form the syngas and to form $O_2$ that is swept away from the HTCE unit by the $CO_2$ sweep gas, and the $O_2$ and $CO_2$ are then introduced to a combustion device (e.g., a gasifier), which may be configured to generate electrical power, as a result of combusting a carbonaceous fuel in the presence of the $O_2$ and $CO_2$. The HTCE unit is powered at least in part by power from an electricity-
(Continued)

generating sub-system (e.g., at least one nuclear power plant). Related systems are also disclosed.

20 Claims, 2 Drawing Sheets (51) Int. Cl.
 C25B 1/04 (2021.01)
 C25B 15/08 (2006.01)
 F02C 3/34 (2006.01)
 F02C 6/10 (2006.01)
(52) U.S. Cl.
 CPC .............. *C25B 15/08* (2013.01); *F02C 3/34* (2013.01); *F02C 6/10* (2013.01)

(56) References Cited

U.S. PATENT DOCUMENTS

| | | |
|---|---|---|
| 8,366,902 B2 | 2/2013 | Hawkes et al. |
| 8,444,725 B2 | 5/2013 | Agrawal et al. |
| 8,617,271 B2 | 12/2013 | Zamansky et al. |
| 8,722,003 B1 | 5/2014 | Avagliano et al. |
| 9,290,422 B2 | 3/2016 | Drnevich et al. |
| 2008/0098654 A1 | 5/2008 | Cherry et al. |
| 2008/0103220 A1 | 5/2008 | Cherry et al. |
| 2009/0235587 A1 | 9/2009 | Hawkes et al. |
| 2010/0129691 A1 | 5/2010 | Dooher et al. |
| 2012/0181483 A1 | 7/2012 | Simmons et al. |
| 2013/0233692 A1 | 9/2013 | Rinker |
| 2015/0024448 A1 | 1/2015 | Djadali et al. |
| 2015/0073188 A1 | 3/2015 | Floudas et al. |
| 2019/0013539 A1* | 1/2019 | Reytier ................ C25B 11/036 |

FOREIGN PATENT DOCUMENTS

| | | |
|---|---|---|
| WO | 2008/067221 A1 | 6/2008 |
| WO | 2009/018200 A1 | 2/2009 |
| WO | 2010/008494 A1 | 1/2010 |

OTHER PUBLICATIONS

Chen et al., "Feasibility analysis of nuclear-coal hybrid energy systems from the perspective of low-carbon development", Applied Energy, 158 (2015), pp. 619-630.

International Search Report and Written Opinion received for PCT Patent Application No. PCT/US2018/017542, dated May 30, 2018, 11 pages.

Kaniyal et al., "Polygeneration of Liquid Fuels and Electricity by the Atmospheric Pressure Hybrid Solar Gasification of Coal," American Chemical Society, Energy Fuels, vol. 27, (2013), pp. 3538-3555.

Kuravi et al., "Thermal Energy Storage Technologies and Systems for Concentrating Solar Power Plants," Progress in Energy and Combustion Science, vol. 39, (2013), pp. 285-319.

Ruth et al., "Nuclear-Renewable Hybrid Energy Systems: Opportunities, Interconnections, and Needs," Energy Conversion and Management, vol. 78, (2014), pp. 684-694.

Tan "Small Modular Nuclear Reactors" Dec. 11, 2015 (Dec. 11, 2015) p. 1 para[0004]-[0007]; Retrieved from http://large.stanford.edu/courses/2015/ph240/tan2/ on Mar. 29, 2018 (Mar. 29, 2018).

* cited by examiner

METHODS AND SYSTEMS FOR SYNGAS PRODUCTION AND FOR EFFICIENT, FLEXIBLE ENERGY GENERATION

CROSS-REFERENCE TO RELATED APPLICATIONS

This application is a national phase entry under 35 U.S.C. § 371 of International Patent Application PCT/US2018/017542, filed Feb. 9, 2018, designating the United States of America and published in English as International Patent Publication WO 2018/148490 A1 on Aug. 16, 2018, which claims the benefit of the filing date under Article 8 of the Patent Cooperation Treaty of United States Provisional Patent Application Ser. No. 62/456,963, filed Fe. 9, 2017, for "METHODS AND SYSTEMS FOR SYNGAS PRODUCTION AND FOR EFFICIENT, FLEXIBLE ENERGY GENERATION."

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

TECHNICAL FIELD

The disclosure, in various embodiments, relates generally to production of hydrogen ($H_2$) and carbon monoxide (CO)—useful for the production of synthetic fuels or for reducing metal oxide materials—along with generation of energy. More particularly, this disclosure relates to methods and systems in which hydrogen ($H_2$) and carbon monoxide (CO) are produced, and in which energy is generated, via integration of a combustion sub-system (e.g., an integrated gasification combined cycle (IGCC) power plant) with a high-temperature co-electrolysis (HTCE) unit, which may be powered by an energy-generating sub-system (e.g., one or more nuclear reactors).

BACKGROUND

As energy consumption in the United States and elsewhere continues to increase, additional methods for producing energy are of interest. Concerns about the increased wastes and pollutants produced by many of the conventional energy production processes, and the low efficiencies of such processes, have led to further research for cleaner, safer, and more readily available energy sources.

In response to the increasing energy production requirements and the desire to reduce or eliminate pollutants from energy sources, new and cleaner fuel sources are of interest. A known source of cleaner fuels includes synthetic fuels (which may be known in the art and referred to herein as "synfuels"). Synfuels can be made from "synthesis gas" (which may be known in the art and referred to herein as "syngas"). The conversion of syngas into synfuels, using processes such as the Fischer-Tropsch process, is known and has been used throughout the world. The conversion of syngas into synfuels provides a more environmentally sustainable alternative to the continued use of naturally occurring sources of oil and fuels produced from such sources. Further, synfuels may burn cleaner than natural oil and fuels produced therefrom.

Syngas comprises carbon monoxide (CO) and hydrogen ($H_2$). Syngas may be converted or refined to form synfuels such as methane or methanol. Carbon monoxide and hydrogen may also be catalyzed in a Fischer-Tropsch process to convert the carbon monoxide and hydrogen into liquid hydrocarbons.

Syngas may also be used to reduce a metal oxide mineral to a metal in primary metals production. For example, various stoichiometric mixtures of carbon monoxide (CO) and hydrogen ($H_2$) can be used in the reduction of iron ore minerals ($Fe_2O_3$) to iron oxide (FeO) or iron (Fe) that is used for iron and steel making.

The production of syngas is required for the production of synfuels. As the economic viability of producing synfuels from syngas improves, and as additional uses for syngas are developed, new sources of syngas and new methods for producing syngas have been developed. One method for producing syngas has been high temperature electrolysis of water and carbon dioxide into hydrogen and carbon monoxide.

U.S. Pat. No. 7,951,283, issued May 31, 2011, the disclosure of which is incorporated in its entirety herein by this reference, describes methods for forming hydrogen ($H_2$) and carbon monoxide (CO) from water ($H_2O$) (e.g., steam) and carbon dioxide ($CO_2$) using a solid-oxide electrolysis cell to decompose the water to hydrogen and oxygen, to decompose carbon dioxide to carbon monoxide and oxygen, and to react carbon dioxide with at least some of the produced hydrogen to form water and carbon monoxide. Heat generated at a nuclear power plant may be used to heat the steam and carbon dioxide feeds to a temperature desired for syngas production. Moreover, electricity produced by the nuclear power plant may be used to provide a current to the one or more electrolysis cells of the system. The carbon dioxide supplied to the one or more electrolysis cells may be obtained from, for example, the combustion of coal, gas, oil, wastes, or other materials.

U.S. Pat. 8,366,902, issued Feb. 5, 2013, the disclosure of which is incorporated in its entirety herein by this reference, describes methods for producing syngas utilizing heat from thermochemical conversion of a carbonaceous fuel to support decomposition of at least one of water and carbon dioxide using one or more solid-oxide electrolysis cells, which may be employed to simultaneously decompose the carbon dioxide and the water. A portion of oxygen produced from the simultaneous decomposition is supplied to a gasifier or combustor to oxidize the carbonaceous fuel to control the carbon-dioxide-to-carbon-monoxide ratio ($CO_2$:CO) produced.

Even with the above developments, there continues to be an interest in improving the efficiency and effectiveness of syngas-producing systems and methods.

BRIEF SUMMARY

Various embodiments of the present disclosure provide methods and systems for syngas production and for efficient, flexible energy generation. According to embodiments herein, syngas is produced by co-electrolysis of water ($H_2O$) and carbon dioxide ($CO_2$) in a high-temperature co-electrolysis (HTCE) unit, in which co-electrolysis produces the syngas (comprising hydrogen ($H_2$) and carbon monoxide (CO)) in addition to oxygen ($O_2$). The syngas may exit the HTCE unit as one output stream, while the oxygen ($O_2$) may exit the HTCE unit with excess carbon dioxide ($CO_2$) (e.g., a $CO_2$ sweep gas) as another output stream. The oxygen ($O_2$) and excess carbon dioxide ($CO_2$) exiting the HTCE unit is passed to a gasifier of an integrated gasification combined cycle (IGCC) plant. Gasification of a carbonaceous fuel within the IGCC power plant, in the presence of the oxygen ($O_2$) and the carbon dioxide ($CO_2$) from the HTCE unit and in the presence of water ($H_2O$), produces output gases that are sent to a combustor and/or steam turbine sub-system of the IGCC power plant, to generate electrical energy that can be provided to, e.g., a power grid. An output stream from the IGCC power plant includes carbon dioxide ($CO_2$), which can be passed back to the HTCE unit. Thus, a portion of the carbon dioxide ($CO_2$) recycled from the IGCC power plant may be electrolytically reduced in the HTCE unit; while, another portion of the recycled carbon dioxide ($CO_2$) may be used as sweep gas in the HTCE unit. The HTCE unit receives power from another power source, which, in some embodiments, may be at least one nuclear reactor. The at least one nuclear reactor may also provide steam (i.e., gaseous water ($H_2O$)) that can be introduced into the HTCE unit for reduction along with the carbon dioxide ($CO_2$) from the IGCC power plant. Electrical power generated by the at least one nuclear reactor can also or alternatively be provided to the power grid. The dual power sources in the system, i.e., the IGCC power plant and the other power source (e.g., the at least one nuclear reactor), may be operated to efficiently distribute power to the power grid (e.g., during periods of high power demand on the power grid) and/or to the HTCE unit (e.g., during periods of low power demand on the power grid). Further, the integration of the HTCE unit with the IGCC power plant and, in some embodiments, with the at least one nuclear reactor provide a system for power generation and for syngas production that has a low carbon footprint. Thus, the integrated system enables high-efficiency syngas production in addition to clean, efficient, and flexible energy (e.g., electrical power) generation.

Accordingly, disclosed is a method for producing syngas comprising hydrogen ($H_2$) and carbon monoxide (CO). The method includes introducing a gasifier input stream to a gasifier. The gasifier input stream comprises oxygen ($O_2$) and carbon dioxide ($CO_2$). In the gasifier, a carbonaceous fuel is gasified in the presence of the oxygen ($O_2$) and the carbon dioxide ($CO_2$) to produce a combustible gas, which is then combusted to generate exhaust gases. The exhaust gasses are passed through at least one turbine to generate power and to produce an output stream comprising carbon dioxide ($CO_2$). A first input stream and a second input stream are supplied to a high-temperature co-electrolysis (HTCE) unit. The first input stream comprises water ($H_2O$) and a portion of the carbon dioxide ($CO_2$) of the output stream. The second input stream comprises another portion of the carbon dioxide ($CO_2$) of the output stream. In the HTCE unit, both the water ($H_2O$) and the portion of the carbon dioxide ($CO_2$) are reduced, by co-electrolysis, to produce the oxygen ($O_2$) and the syngas comprising the hydrogen ($H_2$) and the carbon monoxide (CO). The oxygen ($O_2$) and excess carbon dioxide ($CO_2$) from the HTCE unit are transported to the gasifier as the gasifier input stream.

Also disclosed is a method for generating energy and for producing syngas comprising hydrogen ($H_2$) and carbon monoxide (CO). The method comprises introducing both water ($H_2O$) and carbon dioxide ($CO_2$) to a high-temperature co-electrolysis (HTCE) unit. In the HTCE unit, both the water ($H_2O$) and the carbon dioxide ($CO_2$) are reduced to form the syngas comprising the hydrogen $H_2$ and the carbon monoxide (CO) and to form oxygen ($O_2$). The oxygen ($O_2$) is swept away from the HCE unit using excess carbon dioxide ($CO_2$). The oxygen ($O_2$), accompanied by the excess carbon dioxide ($CO_2$), is introduced to a coal-fired gasifier. In the coal-fired gasifier, coal is gasified in the presence of the oxygen ($O_2$), the excess carbon dioxide ($CO_2$), and additional water ($H_2O$) to produce additional syngas comprising additional hydrogen ($H_2$) and additional carbon monoxide (CO). The additional syngas is introduced to a combustor outputting to at least one turbine to generate electrical power and to produce the carbon dioxide ($CO_2$) to be introduced to the HTCE unit. The HTCE unit is powered with electrical power supplied by at least one nuclear reactor.

Moreover, disclosed is a system for producing syngas comprising hydrogen ($H_2$) and carbon monoxide (CO) and for generating electrical power. The system includes a high-temperature co-electrolysis (HTCE) unit. At least one nuclear reactor is configured to provide electrical power to the HTCE unit and is configured to provide steam ($H_2O$) to the HTCE unit. The system also includes an integrated gasification combined cycle (IGCC) power plant. An oxygen ($O_2$) and carbon dioxide ($CO_2$) stream line is in communication with both the HTCE unit and the IGCC power plant. Another carbon dioxide ($CO_2$) stream line is in communication with both the HTCE unit and the IGCC power plant.

Further, disclosed is a method for producing syngas comprising hydrogen ($H_2$) and carbon monoxide (CO). The method comprises introducing an input stream comprising water ($H_2O$) and carbon dioxide ($CO_2$) to a high-temperature co-electrolysis (HTCE) unit. A carbon dioxide ($CO_2$) sweep gas is introduced to the HTCE unit, as well. In the HTCE unit, both the water ($H_2O$) and the carbon dioxide ($CO_2$) of the input stream are reduced to form the syngas comprising the hydrogen ($H_2$) and the carbon monoxide and to form oxygen ($O_2$). The oxygen ($O_2$) is swept away from the HTCE unit using the carbon dioxide ($CO_2$) sweep gas. The oxygen ($O_2$) and the carbon dioxide ($CO_2$) sweep gas are introduced to a combustion sub-system. In the combustion sub-system, a carbonaceous fuel is combusted in the presence of the oxygen ($O_2$) and the carbon dioxide ($CO_2$) sweep gas. The HTCE unit is powered with electrical power supplied by an electricity-generating sub-system.

DETAILED DESCRIPTION

The illustrations presented herein are not meant to be actual views of any particular system or component thereof, but are merely idealized representations that are employed to describe embodiments of the present disclosure.

As used herein, the term "syngas" means and includes a gas useful to produce synthetic fuels, wherein the syngas comprises, consists essentially of, or consists of hydrogen ($H_2$) and carbon monoxide (CO).

As used herein, the term "co-electrolysis" means and includes simultaneously reducing, by electrolysis, multiple compounds. For example, simultaneous reduction of both water ($H_2O$) and carbon dioxide ($CO_2$) is a type of "co-electrolysis" as that term is used herein.

As used herein, the terms "high-temperature" and "high temperature" mean and refer to temperatures of at least 500° C. (e.g., at least about 800° C. (e.g., at least 800° C.), between about 500° C. and about 1200° C. (e.g., between about 800° C. and 1000° C.)), As used herein, the term "high-temperature co-electrolysis" means and refers to co-electrolysis occurring at operating temperatures that are high temperatures, as that term is defined above.

As used herein, the term "excess carbon dioxide," when referring to carbon dioxide in a material stream exiting a system unit, includes any or all of the carbon dioxide ($CO_2$) that exits the indicated unit. Therefore, "excess carbon dioxide" includes carbon dioxide ($CO_2$) that was introduced into, e.g., a high-temperature co-electrolysis (HTCE) unit and that passed through the HTCE unit without being electrochemically reduced or otherwise chemically converted; and, the "excess carbon dioxide" would also include any carbon dioxide ($CO_2$) that might have formed within the HTCE unit, e.g., during the various chemical reactions taking place therein.

As used herein, the term "carbonaceous fuel," means and includes a solid, liquid, or gas form of a combustible material comprising carbon-containing compounds. For example, and without limitation, the carbonaceous fuel may be a fossil fuel, e.g., coal, such as brown coal, peat, wood, coke, soot, or combinations thereof, or a liquid fuel, such as heavy oils (e.g., tar sand oil, shale oil), or combinations thereof. As another example, and without limitation, the carbonaceous fuel may be a biomass source comprising primarily vegetative matter, such as corn stover, wheat straw, barley straw, tree bark, wood waste, cellulose, bagasse, municipal wastes, or combinations thereof. As yet another example, and without limitation, the carbonaceous fuel may include refinery residue. The carbonaceous fuel may include combinations of any of the carbon-containing compounds mentioned above.

Methods and systems for syngas production and for efficient, flexible energy generation are disclosed. According to embodiments of the present disclosure, a high-temperature co-electrolysis (HTCE) unit is used in conjunction with an integrated gasification combined cycle (IGCC) plant and with another power source, which may include at least one nuclear reactor, to both produce syngas (comprising hydrogen ($H_2$) and carbon monoxide (CO)), while also generating energy (e.g., electrical power) from either or both the IGCC power plant and the other power source. The hybrid energy system and conjunctive use of the HTCE unit and IGCC power plant may enable production of the syngas and generation of electrical power with improved efficiency and improved flexibility of energy generation, as compared to conventional syngas-production systems.

The following description provides specific details, such as material stream compositions, system units, and operation conditions in order to provide a thorough description of embodiments of the disclosure. However, a person of ordinary skill in the art will understand that the embodiments of the disclosure may be modified to certain extents without departing from the disclosure.

Figure 1:
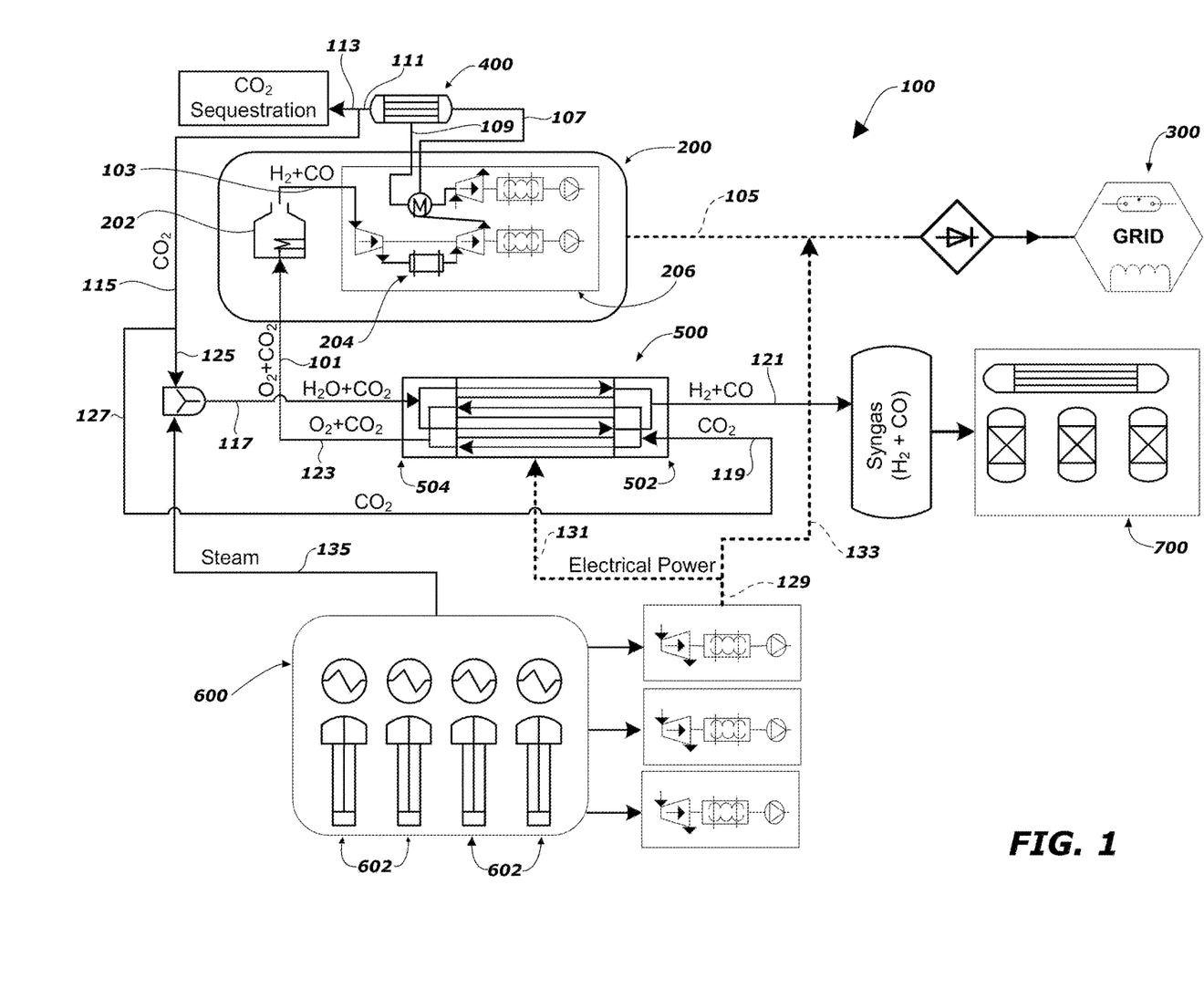
FIG. 1 is a schematic diagram of a system to be used in a method for syngas production and for efficient, flexible energy generation, according to an embodiment of the present disclosure.

FIG. 1 is a schematic illustration of a system 100 to implement methods for syngas production and for the efficient, flexible production of energy (e.g., electrical power). The system 100 includes an integrated gasification combined cycle (IGCC) power plant 200 (also referred to herein as an "IGCC power plant") that includes a gasifier 202, a combustor 204, and at least one turbine 206. In some embodiments, the gasifier 202 may be a conventional gasifier. Types of gasifiers known in the art and that may be used as the gasifier 202 of the IGCC power plant 200 include updraft gasifiers, downdraft gasifiers, and fluidized bed gasifiers.

The IGCC power plant 200 is used to produce energy (e.g., electrical power). More particularly, a material stream 101 comprising oxygen ($O_2$) and, at least in some embodiments, also carbon dioxide ($CO_2$), is introduced to the gasifier 202, in which a slurry of water ($H_2O$) and a carbonaceous fuel (e.g., coal) are gasified in the presence of the oxygen ($O_2$) and the carbon dioxide ($CO_2$) by oxygen-blown gasification to produce a gasifier output stream 103 comprising a syngas comprising the hydrogen ($H_2$) and carbon monoxide (CO), i.e., a combustible syngas. The gasifier output stream 103 of syngas is supplied to the combustor 204, and the exhaust gases from the combustor 204 are used to drive the at least one turbine 206 (e.g., at least one gas turbine), while excess heat from the gasifier 202 is used to drive at least one other turbine 206 (e.g., at least one steam turbine (steam line not shown)). The IGCC power plant 200 therefore generates energy, e.g., electrical power 105 that can be provided to a power grid 300, and produces an output stream 107 of carbon dioxide ($CO_2$) and steam ($H_2O$).

The steam ($H_2O$) of the output stream 107 can be separated from the carbon dioxide ($CO_2$) of the output stream 107 by straightforward methods known in the art, which are therefore not described in detail herein. For such methods, a water separation unit 400 may be used to recover the water ($H_2O$), which can then be recycled (e.g., by stream 109) to the steam turbines of the at least one turbine 206 in the IGCC power plant 200, where the excess heat from other processes of the IGCC power plant 200 generates additional steam ($H_2O$) to run through the steam turbines.

The separation of the water ($H_2O$) out of the output stream 107 leaves a stream 111 of nearly-pure carbon dioxide ($CO_2$). In some embodiments, a portion of the carbon dioxide ($CO_2$) can be sequestered, as indicated by stream 113. The remaining carbon dioxide ($CO_2$) of stream 111 can be recycled (by stream 115) for use elsewhere in the system 100.

Because the carbon dioxide ($CO_2$) of stream 111 may be either recycled or sequestered, the IGCC power plant 200 may be operated with a low carbon footprint. Therefore, the IGCC power plant 200 provides clean electrical power. Moreover, the generation of the electrical power 105 using the IGCC power plant 200 has high overall efficiency (e.g., at least about 40% without carbon dioxide sequestration, and about 32% with carbon dioxide sequestration).

If utilizing gasification methods like those generally known in the art, the material stream 101 introduced to the gasifier 202 may consist of or consist essentially of oxygen ($O_2$). For example, the material stream 101 may be free of carbon dioxide. Therefore, the oxygen-blown gasification conducted using the gasifier 202 may be pure oxygen-blown gasification. However, gasification with pure oxygen of, e.g., a coal-including carbonaceous fuel, can require careful temperature control and may result in formation of fly ash and slag. Slag is an inert glass-like material resulting from transforming and melting mineral material of the coal. According to conventional techniques for gasification with pure oxygen, pure oxygen-blown gasification commonly uses an energy-intensive air separation unit (ASU) to supply the oxygen. Though the ASU may be powered by electrical power 105 generated by the IGCC power plant 200, the use of power for the ASU reduces the plant's 200 overall thermal efficiency while emitting additional carbon dioxide ($CO_2$).

To enable improved efficiency, as compared to conventional gasification methods and systems, some embodiments of the present disclosure may include carbon dioxide ($CO_2$) along with the oxygen ($O_2$) in the material stream 101 introduced to the gasifier 202.

Thus, methods of the present disclosure make use of oxygen-and-carbon-dioxide-blown gasification in the gasifier 202. Inclusion of carbon dioxide ($CO_2$) in the material stream 101 introduced to the gasifier 202 provides better temperature control, as compared to conventional gasifier system. It also may reduce slag formation. The carbon dioxide ($CO_2$) in the material stream 101 also enables increased production of carbon monoxide (CO) in the gasifier output stream 103, via the Boudouard reaction, as follows:

$$C + CO_2 \leftrightarrow 2CO (-179 \text{ kJ/mol}^\circ \text{ C.})$$

The increase in carbon monoxide (CO) produced and included in the gasifier output stream 103 provides additional combustible syngas to be burned in the combustor 204 to generate the electrical power 105.

In some embodiments (not illustrated), part of the recycled carbon dioxide ($CO_2$) of stream 115 can be joined with the material stream 101 or otherwise introduced back into the gasifier 202. Such recycling of carbon dioxide ($CO_2$) from the gasifier output stream 103 to the gasifier input stream, i.e., material stream 101 therefore may enable increased production of carbon monoxide and, subsequently, increased electrical power 105 generation.

The oxygen ($O_2$) and the carbon dioxide ($CO_2$) in the material stream 101 introduced to the gasifier may be supplied by a high-temperature co-electrolysis (HTCE) unit 500 configured to convert a steam ($H_2O$) and carbon dioxide ($CO_2$) mixture into hydrogen ($H_2$) and carbon monoxide (CO) (i.e., into syngas) while also producing the oxygen ($O_2$). The HTCE unit 500 may include at least one solid-oxide electrolysis cell, such as that described in aforementioned U.S. Pat. No. 7,951,283. Thus, the HTCE unit 500 includes a cathode side 502 and an anode side 504. A first input stream 117, comprising, consisting of, or consisting essentially of steam ($H_2O$) and carbon dioxide ($CO_2$) is introduced into the HTCE unit 500. The steam ($H_2O$) and the carbon dioxide ($CO_2$) are simultaneously electrolytically converted to hydrogen ($H_2$) and carbon monoxide (CO) (i.e., syngas) on the cathode side 502 of the HTCE unit 500. Meanwhile, oxygen ($O_2$) is released on the anode side 504. Though, conventionally, air is generally used as a "sweep gas" to dilute and mobile the produced oxygen ($O_2$), in embodiments of the present disclosure, carbon dioxide ($CO_2$) is used as the sweep gas. Thus, a second input stream 119, comprising, consisting of, or consisting essentially of carbon dioxide ($CO_2$) is introduced into the HTCE unit 500. While the first input stream 117 of the steam ($H_2O$) and carbon dioxide ($CO_2$) to be reduced may be introduced from the anode side 504 of the HTCE unit 500, the second input stream 119 of the carbon dioxide ($CO_2$) sweep gas may be introduced from the cathode side 502 of the HTCE unit 500.

The syngas (comprising the hydrogen ($H_2$) and the carbon monoxide (CO)), resulting from the electrolytic conversion of the steam ($H_2O$) and the carbon dioxide ($CO_2$) of the first input stream 117, exits the HTCE unit 500 as a first output stream 121. The syngas of this first output stream 121 may then be used for production of synfuels in a synfuels production sub-system 700, such as by supplying the syngas of the first output stream 121 to a Fischer-Tropsch liquid fuel synthesis plant.

According to some embodiments of the present disclosure, the syngas produced by the system 100 for the subsequent production of synfuels is the syngas exiting the HTCE unit 500 and does not include the syngas exiting (via the gasifier output stream 103) the gasifier 202 of the IGCC power plant 200. Rather, the syngas existing the gasifier 202 may be solely used for combustion in the combustor 204 of the IGCC power plant 200.

The oxygen ($O_2$) released at the anode side 504 of the HTCE unit 500 exits the HTCE unit 500 as part of a second output stream 123. The second output stream 123 further includes excess carbon dioxide ($CO_2$), which may include the carbon dioxide ($CO_2$) sweep gas that was introduced in the second input stream 119. It is contemplated that the feeds to the HTCE unit 500, such as the amount of carbon dioxide ($CO_2$) sweep gas supplied by the second input stream 119, as well as operating conditions within the HTCE unit 500 may be tailored to produce desired stoichiometric mixtures of oxygen ($O_2$) and carbon monoxide (CO) in the second output stream 123. The ability of the system 100 to be used to generate the selective stoichiometric mixtures of oxygen ($O_2$) and carbon monoxide (CO) exiting the HTCE unit 500 is another benefit enabled by embodiments of the present disclosure.

The oxygen ($O_2$) and excess carbon dioxide ($CO_2$) in the second output stream 123 is then supplied, together, to the gasifier 202 of the IGCC power plant 200 as material stream 101. Thus, the HTCE unit 500 supplies the oxygen ($O_2$) (as electrolytically-produced oxygen ($O_2$)) and the carbon dioxide ($CO_2$) to the IGCC power plant 200. The inclusion of the excess carbon dioxide ($CO_2$) in the second output stream 123, and therefore in the material stream 101, enables the improved temperature control and increased carbon monoxide (CO) production in the gasifier 202, as discussed above. In addition, the ability to selectively control the stoichiometric mixture of oxygen ($O_2$) and carbon dioxide ($CO_2$) fed to the IGCC power plant 200 may also enable improved control in the IGCC power plant 200.

The carbon dioxide ($CO_2$) of one or both of the first input stream 117 and the second input stream 119 may be carbon dioxide ($CO_2$) produced by the IGCC power plant 200. Accordingly, stream 115 of carbon dioxide ($CO_2$) may be split (evenly or otherwise) into a first recycle stream 125 and a second recycle stream 127. Therefore, one portion (e.g., first recycle stream 125) of the carbon dioxide ($CO_2$) exiting the IGCC power plant 200 (e.g., after water separation using the water separation unit 400) may be combined with water ($H_2O$) and provided to the HTCE unit 500 as the first input stream 117; while, another portion (e.g., second recycle stream 127) of the carbon dioxide ($CO_2$) of stream 111 and stream 115 may be supplied to the HTCE unit 500 as the second input stream 119 to be used as sweep gas.

Because it is expected that the carbon dioxide ($CO_2$) output from the IGCC power plant 200 (e.g., after water separation) will be of a high temperature, the hot carbon dioxide ($CO_2$) supplied to the HTCE unit 500 in the first input stream 117 and the second input stream 119 may provide the high-temperature heat required to maintain the high-temperature operation of the high-temperature co-electrolysis process carried out using the HTCE unit 500. Accordingly, at least in some embodiments, the HTCE unit 500 may be operated at a high temperature without a heat source other than the heat of materials in the first and second input streams 117, 119.

The heat recovery from the gasifier, via the recycling of hot carbon dioxide ($CO_2$) to both the cathode side 502 and the anode side 504 of the HTCE unit 500, improves the energy efficiency of the system 100. Thus, the carbon dioxide ($CO_2$) of the IGCC power plant 200 output stream 111 serves as the source for the carbon dioxide ($CO_2$) to be electrolytically reduced (in first input stream 117), the source for the carbon dioxide ($CO_2$) to be used as the sweep gas to carry away the released oxygen ($O_2$) (in second output stream 123), and also as a heat source for maintaining temperatures needed for operating the HTCE unit 500.

Notably, all of the products of the HTCE unit 500 are used downstream for fuel or energy production. That is, the hydrogen ($H_2$) and the carbon monoxide (CO) (syngas) of the first output stream 121 is used for production of synfuels, while the oxygen ($O_2$) and carbon dioxide ($CO_2$) (i.e., excess carbon dioxide, including the sweep gas) of the second output stream 123 is used in the IGCC power plant 200 for generation of electrical power to be provided to, e.g., the power grid 300. Accordingly, the HTCE unit 500, in conjunction with the other components or sub-systems of the system 100 (e.g., the IGCC power plant 200) yields low (e.g., zero) carbon dioxide ($CO_2$) emissions to the atmosphere (e.g., with no "carbon footprint").

The HTCE unit 500 may be powered by another power source. In some embodiments, the other power source may be at least one nuclear reactor 600, such as co-located, next-generation, small, modular, nuclear reactors. Small modular reactors (SMRs) 602, as may be used in the system 100 and according to embodiments of the present disclosure, are known in the art and so are not described in detail herein. By use of the SMRs 602, "clean" electrical power 129 is generated and can be used, selectively, to power the HTCE unit 500, as indicated by line 131. Alternatively or additionally, the clean electrical power 129 can be provided, selectively, to the power grid 300, as indicated by line 133.

The availability of two sources of power-generating units of the system 100, i.e., the IGCC power plant 200 and the at least one nuclear reactor 600 (or other alternative power source) enables increased power use flexibility and increased energy efficiency. For example, when the power grid 300 experiences a low demand for (high supply of) electrical power, the surplus of electrical power 129 available from the at least one nuclear reactor 600 can be used to operate the HTCE unit 500 to produce the syngas of the first output stream 121 and, subsequently, to produce the synfuels. The ability to produce the synthetic fuel during times of lower demand from the power grid 300 enables efficient utilization of the power-generating resources in the system 100 and also exploits cheap electricity during the low-demand periods, minimizing operating costs of the HTCE unit 500 and resulting in relatively low-cost synthetic fuel production. Correspondingly, when the power grid 300 experiences a high demand for (low supply of) electrical power, the at least one nuclear reactor 600 and/or the IGCC power plant 200 can be operated to provide electrical power 105, 133 to the power grid 300 while, optionally, not operating the HTCE unit 500. Therefore, the system 100, with its integration of the HTCE unit 500, the IGCC power plant 200, and, in some embodiments, the at least one nuclear reactor 600, provides load leveling for a power grid (e.g., the power grid 300) that is becoming increasingly intermittent with the introduction of large-scale renewable energy sources. Accordingly, the system 100 may be characterized as a flexible, hybrid energy system that enables high-efficiency power generation along with the flexibility of being able to respond to fluctuations in power grid 300 demand. In other words, the system 100 enables maximum overall system utilization and profit by enabling the dedication of electrical power either to the power grid 300 or to syngas/synfuel production, selectively and depending on power grid 300 demand and the associated cost of power grid 300 electricity.

The use of the at least one nuclear reactor 600 as the other power source for the system 100 also provides a source of steam ($H_2O$) to be supplied to the HTCE unit 500 for electrolytic conversion. That is, operation of the at least one nuclear reactor 600, according to conventional methods as known in the art, and therefore not described herein, yields steam ($H_2O$), as indicated by stream 135. The steam ($H_2O$) of stream 135, output from the at least one nuclear reactor 600, may be introduced to the HTCE unit 500 as part of the first input stream 117. For example, the stream 135 may be combined with the first recycle stream 125 of carbon dioxide ($CO_2$), produced by the IGCC power plant 200, to form the first input stream 117 comprising the water (e.g., steam) ($H_2O$) and carbon dioxide ($CO_2$) to be reduced in the HTCE unit 500.

Notably, the at least one nuclear reactor 600 may provide the electrical power 129 for the power grid 300 or for operating the HTCE unit 500, and may provide the steam (of stream 135) for the HTCE unit 500 with no carbon dioxide emissions. Therefore, the use of the at least one nuclear reactor 600 as the other power source of the system 100 provides "clean" power. In addition, the generation of the electrical power 105 by the IGCC power plant 200 may utilize the clean power source of the carbonaceous fuels, in light of the recycling, or sequestration, of the produced carbon dioxide ($CO_2$) from stream 111. Thus, the system 100 enables clean power generation in addition to production of syngas for synthetic fuels production.

Accordingly, disclosed are systems and methods for both producing syngas (for synfuel production) and for the efficient and flexible generation of energy (e.g., electrical power) in a manner that can be adjusted in light of changes of power demand on the power grid. The systems and methods may generate clean power such as by using clean coal and nuclear-based power generation while incorporating carbon dioxide ($CO_2$) recycling and, optionally, sequestration. The increased efficiency of the system enables lower cost production of syngas and, therefore, synfuels.

Figure 2:
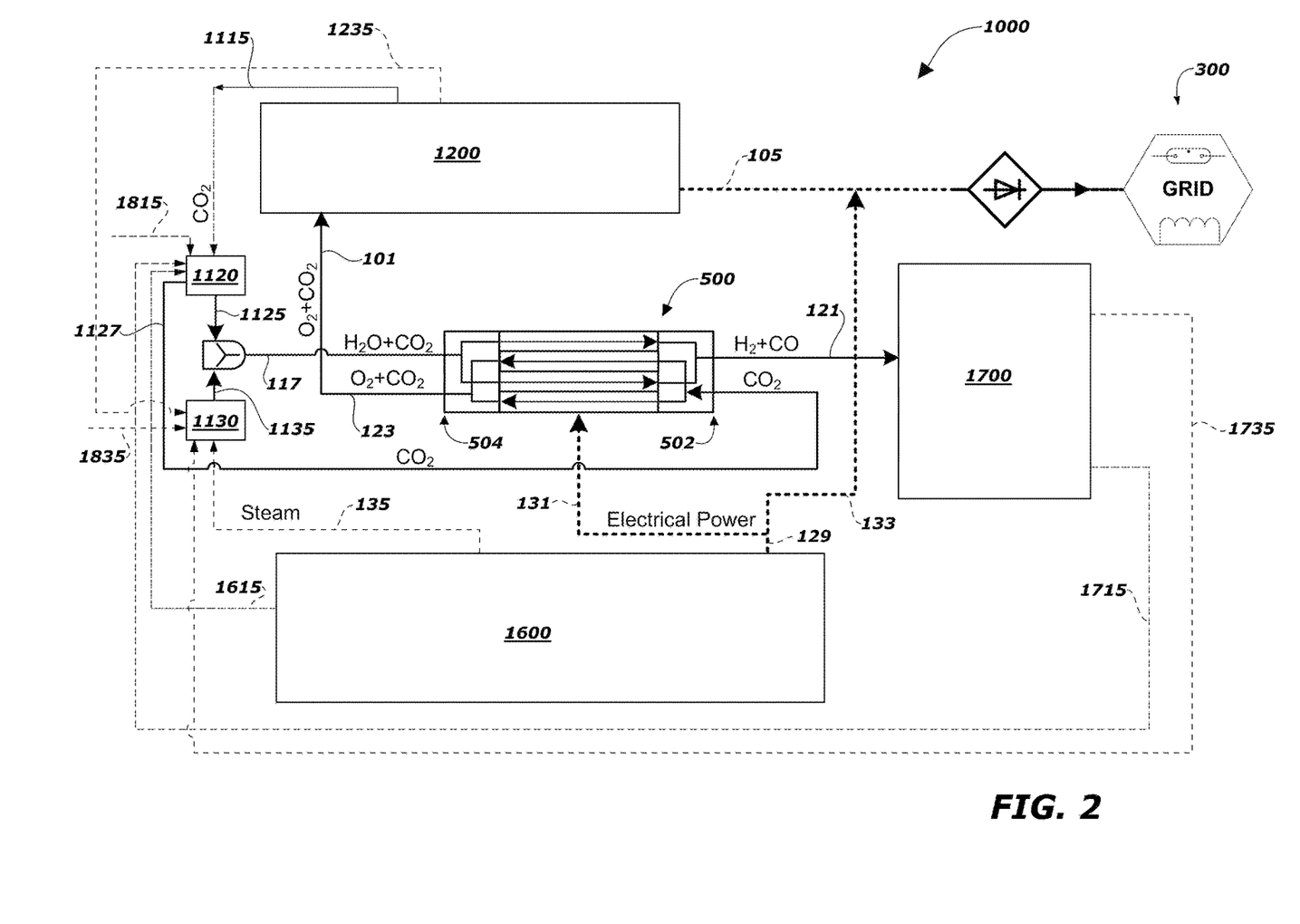
FIG. 2 is a schematic diagram of a system to be used in a method for syngas production and for efficient, flexible energy generation, according to another embodiment of the present disclosure.

Though the above-discussed embodiments include the IGCC power plant 200 and the at least one nuclear reactor 600 in the system 100 for producing syngas for, e.g., synfuels production 700, in other embodiments, a different combustion system may be used instead of the IGCC power plant 200, a different electricity-generating sub-system may be used instead of at least one nuclear reactor 600, and the produced syngas may be used in another syngas-using system. FIG. 2 schematically illustrates such an alternative system 1000.

The system 1000 includes a combustion sub-system 1200, which may be the IGCC power plant 200 of FIG. 1 or some other combustion sub-system that may be fed with the oxygen ($O_2$) and carbon dioxide ($CO_2$) sweep gas exiting the HTCE unit 500 in material stream 101. Thus, the HTCE unit 500 may be used to produce an output (i.e., the material stream 101) with a selectively-controlled stoichiometric mixture of oxygen ($O_2$) and carbon dioxide ($CO_2$) that may be fed to any combustion device of a combustion sub-system (e.g., combustion sub-system 1200) as a substitute for supplying air to the sub-system 1200.

The combustion sub-system 1200, whether the IGCC power plant 200 of FIG. 1 or some other sub-system that includes a combustion device, may be configured to generate the electrical power 105 that can be provided to the power grid 300. Thus, as used herein "combustion sub-system" may include both at least one combustion device and at least one power-generating device (e.g., turbine), which may generate power due to its operative connection with the at least one combustion device.

The combustion sub-system 1200 may produce a stream 1115 comprising, consisting of, or consisting essentially of carbon dioxide ($CO_2$). In some embodiments, the combustion sub-system 1200 may also produce a stream 1235 comprising, consisting of, or consisting essentially of steam ($H_2O$). Thus, the output stream from a combustion sub-system 1200 that burns the oxygen ($O_2$) and carbon dioxide ($CO_2$) mixtures of material stream 101 may be recycled to the HTCE unit 500. The combustion sub-system 1200 may combust a carbonaceous fuel in the presence of the oxygen ($O_2$) and carbon dioxide ($CO_2$) of the material stream 101.

The system 1000 also includes an electricity-generating sub-system 1600, which may be the at least one nuclear reactor 600 of FIG. 1 or some other electricity-generating system that may produce the electrical power 129 that is selectively used to power the HTCE unit 500 or to supply the power grid 300. The electricity-generating sub-system 1600 may supply the stream 135 comprising steam ($H_2O$). In some embodiments, the electricity-generating sub-system 1600 may also output a stream 1615 comprising, consisting of, or consisting essentially of carbon dioxide ($CO_2$).

The system 1000 also includes a syngas-using sub-system 1700, which may be the synfuels production system 700 of FIG. 1 or some other syngas-using sub-system, such as a metal reduction reactor. For example, the syngas produced by the HTCE unit 500, in first output stream 121, may be used to reduce metal-oxide-containing minerals and materials. In some such embodiments, minerals or ores that include iron oxide ($Fe_2O_3$) may be reduced, using the syngas, to FeO or Fe for the production of iron and steel. Such FeO and Fe may be known in the art as "direct reduced iron."

The syngas-using sub-system 1700 may output a stream 1715 comprising, consisting of, or consisting essentially of carbon dioxide ($CO_2$). For example, a metal reduction reactor may output an effluent gas (e.g., stream 1715) comprising carbon dioxide ($CO_2$). In some embodiments, the syngas-using sub-system 1700 may also output a stream 1735 comprising, consisting of, or consisting essentially of steam ($H_2O$).

The carbon dioxide ($CO_2$) of the first input stream 117 supplied to the HTCE unit 500 is carbon dioxide ($CO_2$) supplied from a carbon dioxide ($CO_2$) source 1120, and the steam ($H_2O$) of the first input stream 117 supplied to the HTCE unit 500 is steam ($H_2O$) supplied from a steam ($H_2O$) source 1130. The carbon dioxide ($CO_2$) sweep gas of the second input stream 119 fed to the HTCE unit 500 is also supplied from the carbon dioxide ($CO_2$) source 1120, by stream 1127. In some embodiments, the sources 1120, 1130 may be distinct reservoirs, may be combined reservoirs, or may just be distinct or combined lines continuing from other lines of the system 1000.

The carbon dioxide ($CO_2$) source 1120 may receive carbon dioxide ($CO_2$) from one or more of the stream 1115 output from the combustion sub-system 1200, the stream 1615 output from the electricity-generating sub-system 1600, the stream 1715 output from the syngas-using sub-system 1700, or another stream 1815 comprising, consisting of, or consisting essentially of carbon dioxide ($CO_2$). Thus, the system 1000 may be configured to recycle all or only a portion, as desired, of the carbon dioxide ($CO_2$) output from subsystems (e.g., sub-systems 1200, 1600, 1700) of the system 1000.

The steam ($H_2O$) source 1130 may receive water ($H_2O$) from one or more of the stream 1235 output from the combustion sub-system 1200, the stream 135 output from the electricity-generating sub-system 1600, the stream 1735 output from the syngas-using sub-system 1700, or another stream 1835 comprising, consisting of, or consisting essentially of water ($H_2O$).

The steam source 1130 supplies the steam ($H_2O$), in stream 1135, that is joined with carbon dioxide ($CO_2$) from the carbon dioxide ($CO_2$) source 1120, e.g., in stream 1125, to form the first input stream 117 fed to the HTCE unit 500. The steam ($H_2O$) of the source 1130 may heated, either before entering the source 1130 or after exiting the source 1130, from heat recycled from one or more sub-systems 1200, 1600, 1700, or even the HTCE unit 500 of the system 1000. For example, in embodiments in which the electricity-generating sub-system 1600 includes or is the at least one nuclear reactor 600 of FIG. 1, the electricity-generating sub-system 1600 may also provide heat that can produce the steam ($H_2O$) of stream 135. As another example, in embodiments in which the syngas-using sub-system 1700 includes a metal reduction reactor, heat from the metal reduction reactor (or, alternatively or additionally, from another unit operation used in iron or steel manufacturing) may be used to supply or to supplement the thermal duties of the HTCE unit 500. As additional examples, heat and steam duties for the HTCE unit 500 may also be supplied or supplemented by heat recovery from the combustion sub-system 1200 (e.g., the IGCC power plant 200 of FIG. 1). Thus, the system 1000 may be configured to recycle all or only a portion, as desired, of water ($H_2O$) and our heat output from sub-systems (e.g., sub-systems 1200, 1600, 1700) of the system 1000 to supply the heat and/or steam for operating the HTCE unit 500.

Given the abilities to recycle carbon dioxide ($CO_2$), water ($H_2O$), and heat from the system, while producing syngas for use in the syngas-using sub-system 1700 and while generating electrical power that may be flexibility used, the embodiments of the present disclosure enable efficient, flexible, and clean syngas and power generation.

Additional non-limiting example embodiments of this disclosure are set forth below.

Embodiment 1

A method for generating energy and for producing syngas comprising hydrogen ($H_2$) and carbon monoxide (CO), the method comprising: introducing both water ($H_2O$) and carbon dioxide ($CO_2$) to a high-temperature co-electrolysis (HTCE) unit; in the HTCE unit, reducing both the water ($H_2O$) and the carbon dioxide ($CO_2$) to form the syngas comprising the hydrogen ($H_2$) and the carbon monoxide (CO) and to form oxygen ($O_2$) accompanied by excess carbon dioxide ($CO_2$); sweeping the oxygen ($O_2$) away from the HTCE unit using excess carbon dioxide ($CO_2$); introducing the oxygen ($O_2$) accompanied by the excess carbon dioxide ($CO_2$) to a coal-fired gasifier; in the coal-fired gasifier, gasifying coal in the presence of the oxygen ($O_2$), the excess carbon dioxide ($CO_2$), and additional water ($H_2O$) to produce additional syngas comprising additional hydrogen ($H_2$) and additional carbon monoxide (CO); introducing the additional syngas to a combustor outputting to at least one turbine to generate electrical power and to produce the carbon dioxide ($CO_2$) to be introduced to the HTCE unit; and powering the HTCE unit with electrical power supplied by at least one nuclear reactor.

Embodiment 2

The method of Embodiment 1, further comprising using the at least one nuclear reactor to provide the water ($H_2O$) to be introduced to the HTCE unit.

Embodiment 3

The method of any one of Embodiments 1 and 2, further comprising, while introducing both the water ($H_2O$) and the carbon dioxide ($CO_2$) to the HTCE unit, also introducing additional carbon dioxide ($CO_2$) to the HTCE unit, the additional carbon dioxide ($CO_2$) being a portion of the carbon dioxide ($CO_2$) produced by the at least one turbine.

Embodiment 4

The method of any one of Embodiments 1 through 3, wherein introducing the additional syngas to a combustor comprises introducing all of the additional syngas to the combustor.

Embodiment 5

The method of any one of Embodiments 1 through 4, wherein all heat for operation of the HTCE unit is supplied by the water ($H_2O$) and the carbon dioxide ($CO_2$) introduced to the HTCE unit.

Embodiment 6

The method of any one of Embodiments 1 through 5, wherein introducing the additional syngas to a combustor outputting to at least one turbine comprises: combusting the additional syngas in the combustor to produce exhaust gases; and driving at least one gas turbine with the exhaust gases.

Embodiment 7

The method of any one of Embodiments 1 through 6, wherein all oxygen ($O_2$) introduced to the coal-fired gasifier is the oxygen ($O_2$) formed in the HTCE unit.

Embodiment 8

The method of any one of Embodiments 1 through 7, further comprising, providing, to a power grid, at least a portion of the electrical power generated by the at least one turbine and at least a portion of the electrical power supplied by the at least one nuclear reactor.

Embodiment 9

A method for producing syngas comprising hydrogen ($H_2$) and carbon monoxide (CO), the method comprising: introducing an input stream comprising water ($H_2O$) and carbon dioxide ($CO_2$) to a high-temperature co-electrolysis (HTCE) unit; introducing a carbon dioxide ($CO_2$) sweep gas to the HTCE unit; in the HTCE unit, reducing both the water ($H_2O$) and the carbon dioxide ($CO_2$) of the input stream to form the syngas comprising the hydrogen ($H_2$) and the carbon monoxide and to form oxygen ($O_2$); sweeping the oxygen ($O_2$) away from the HTCE unit using the carbon dioxide ($CO_2$) sweep gas; introducing the oxygen ($O_2$) and the carbon dioxide ($CO_2$) sweep gas to a combustion sub-system; in the combustion sub-system, combusting a carbonaceous fuel in the presence of the oxygen ($O_2$) and the carbon dioxide ($CO_2$) sweep gas; and powering the HTCE unit with electrical power supplied by an electricity-generating sub-system.

Embodiment 10

The method of Embodiment 9, wherein: the input stream comprising the water ($H_2O$) and the carbon dioxide ($CO_2$) comprises carbon dioxide ($CO_2$) output from the combustion sub-system; and the carbon dioxide ($CO_2$) sweep gas comprises additional carbon dioxide ($CO_2$) output from the combustion sub-system.

Embodiment 11

The method of any one of Embodiments 9 and 10, wherein the input stream comprising the water ($H_2O$) and the carbon dioxide ($CO_2$) comprises water output from the electricity-generating sub-system.

Embodiment 12

The method of any one of Embodiments 9 through 11, further comprising supplying the syngas to a metal reduction reactor.

While the disclosed methods and systems are susceptible to various modifications and alternative forms in implementation thereof, specific embodiments have been shown by way of example in the drawings and have been described in detail herein. However, it should be understood that this disclosure is not intended to be limited to the particular forms disclosed. Rather, the present disclosure encompasses all modifications, combinations, equivalents, variations, and alternatives falling within the scope of the present disclosure as defined by the following appended claims and their legal equivalents.

What is claimed is:
1. A method for producing syngas comprising hydrogen ($H_2$) and carbon monoxide (CO), the method comprising:
   introducing a gasifier input stream to a gasifier, the gasifier input stream comprising oxygen ($O_2$) and carbon dioxide ($CO_2$);
   in the gasifier, gasifying a carbonaceous fuel in the presence of the oxygen ($O_2$) and the carbon dioxide ($CO_2$) to produce a combustible gas;
   combusting the gas to generate exhaust gases;
   passing the exhaust gases through at least one turbine to generate power and to produce an output stream comprising carbon dioxide ($CO_2$);
   supplying, to a high-temperature co-electrolysis (HTCE) unit, a first input stream comprising water ($H_2O$) and a portion of the carbon dioxide ($CO_2$) of the output stream;
   supplying, to the HTCE unit, a second input stream comprising another portion of the carbon dioxide ($CO_2$) of the output stream;
   in the HTCE unit, reducing, by co-electrolysis, both the water ($H_2O$) and the portion of the carbon dioxide ($CO_2$) to produce the oxygen ($O_2$) and the syngas comprising the hydrogen ($H_2$) and the carbon monoxide (CO); and
   transporting the oxygen ($O_2$) and excess carbon dioxide ($CO_2$) from the HTCE unit to the gasifier as the gasifier input stream.

2. The method of claim 1, further comprising powering the HTCE unit using electrical power generated by at least one nuclear reactor.

3. The method of claim 2, further comprising supplying the water ($H_2O$) of the first input stream from the at least one nuclear reactor.

4. The method of claim 2, further comprising providing at least a portion of the electrical power generated by the at least one nuclear reactor to a power grid.

5. The method of claim 2, wherein the at least one nuclear reactor comprises a plurality of small modular reactors (SMRs).

6. The method of claim 1, further comprising providing the power generated by the at least one turbine to a power grid.

7. The method of claim 1, wherein all heat for operation of the HTCE unit is supplied by the water ($H_2O$) and the carbon dioxide ($CO_2$) introduced to the HTCE unit.

8. The method of claim 1, wherein all the oxygen ($O_2$) introduced to the gasifier is the oxygen ($O_2$) produced from the HTCE unit.

9. The method of claim 1, further comprising:
powering the HTCE unit using electrical power generated by at least one nuclear reactor; and
providing, to a power grid, at least a portion of the power generated by the at least one turbine and at least a portion of the electrical power generated by the at least one nuclear reactor.

10. The method of claim 1, further comprising powering the HTCE unit with electrical power supplied by an electricity-generating sub-system.

11. The method of claim 10, wherein the first input stream comprising the water ($H_2O$) and the portion of the carbon dioxide ($CO_2$) comprises water output from the electricity-generating sub-system.

12. The method of claim 1, further comprising supplying the syngas to a metal reduction reactor.

13. The method of claim 1, wherein gasifying a carbonaceous fuel comprises gasifying coal.

14. A system for producing syngas comprising hydrogen ($H_2$) and carbon monoxide (CO) and for generating electrical power, the system comprising:
a high-temperature co-electrolysis (HTCE) unit;
at least one nuclear reactor configured to provide electrical power to the HTCE unit and configured to provide steam ($H_2O$) to the HTCE unit;
an integrated gasification combined cycle (IGCC) power plant;
an oxygen ($O_2$) and carbon dioxide ($CO_2$) stream line in communication with both the HTCE unit and the IGCC power plant; and
another carbon dioxide ($CO_2$) stream line in communication with both the HTCE unit and the IGCC power plant.

15. The system of claim 14, further comprising a water separation unit operatively following the IGCC power plant and configured to separate carbon dioxide ($CO_2$) output by the IGCC from water output by the IGCC.

16. The system of claim 14, wherein the oxygen ($O_2$) and carbon dioxide ($CO_2$) stream line exits the HTCE unit at an anode side of the HTCE unit.

17. The system of claim 14, wherein the another carbon dioxide ($CO_2$) stream line enters the HTCE unit proximate a cathode side of the HTCE unit.

18. The system of claim 14, wherein the IGCC power plant is not in operative communication with an air separation unit.

19. A method for producing syngas comprising hydrogen ($H_2$) and carbon monoxide (CO), the method comprising:
introducing an input stream comprising water ($H_2O$) and carbon dioxide ($CO_2$) to a high-temperature co-electrolysis (HTCE) unit;
introducing a carbon dioxide ($CO_2$) sweep gas to the HTCE unit;
in the HTCE unit, reducing both the water ($H_2O$) and the carbon dioxide ($CO_2$) of the input stream to form the syngas comprising the hydrogen ($H_2$) and the carbon monoxide and to form oxygen ($O_2$);
sweeping the oxygen ($O_2$) away from the HTCE unit using the carbon dioxide ($CO_2$) sweep gas;
introducing the oxygen ($O_2$) and the carbon dioxide ($CO_2$) sweep gas to a combustion sub-system;
in the combustion sub-system, combusting a carbonaceous fuel in the presence of the oxygen ($O_2$) and the carbon dioxide ($CO_2$) sweep gas; and
power the HTCE unit with electrical power supplied by an electricity-generating sub-system.

20. The method of claim 19, wherein:
the input stream comprising the water ($H_2O$) and the carbon dioxide ($CO_2$) comprises carbon dioxide ($CO_2$) output from the combustion sub-system; and
the carbon dioxide ($CO_2$) sweep gas comprises additional carbon dioxide ($CO_2$) output from the combustion sub-system.

* * * * *

UNITED STATES PATENT AND TRADEMARK OFFICE
CERTIFICATE OF CORRECTION

| | | |
|---|---|---|
| PATENT NO. | : 11,142,832 B2 | Page 1 of 1 |
| APPLICATION NO. | : 16/484776 | |
| DATED | : October 12, 2021 | |
| INVENTOR(S) | : O'Brien et al. | |

It is certified that error appears in the above-identified patent and that said Letters Patent is hereby corrected as shown below:

In the Specification

Column 1, Line 15, change "filed Fe. 9, 2017," to --filed Feb. 9, 2017,--

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*